United States Patent [19]

Rodeheffer

[11] Patent Number: 5,260,945
[45] Date of Patent: Nov. 9, 1993

[54] INTERMITTENT COMPONENT FAILURE MANAGER AND METHOD FOR MINIMIZING DISRUPTION OF DISTRIBUTED COMPUTER SYSTEM

[75] Inventor: Thomas L. Rodeheffer, Mountain View, Calif.

[73] Assignee: Digital Equipment Corporation, Maynard, Mass.

[21] Appl. No.: 721,143

[22] Filed: Jun. 26, 1991

Related U.S. Application Data

[63] Continuation-in-part of Ser. No. 370,285, Jun. 22, 1989.

[51] Int. Cl.$^5$ ............................................. G06F 11/20
[52] U.S. Cl. ................................................... 371/8.2
[58] Field of Search ................. 371/5.1, 8.1, 8.2, 11.1, 371/11.2, 20.1, 29.1; 395/575

[56] References Cited

U.S. PATENT DOCUMENTS

| | | | |
|---|---|---|---|
| 4,105,420 | 4/1992 | Ardon et al. | 371/8.2 |
| 5,146,452 | 9/1992 | Pekarske | 371/8.1 |
| 5,173,689 | 12/1992 | Kusano | 371/8.2 |

*Primary Examiner*—Vincent P. Canney
*Attorney, Agent, or Firm*—Flehr, Hohbach, Test, Albritton & Herbert

[57] ABSTRACT

In a distributed computer system having components which may fail intermittently, a fault monitor, coupled to one component, detects whether that component is working. Whenever the fault monitor detects that the component has failed, i.e., changed from working to broken status, the status filter transmits without delay a "broken" signal. Whenever the fault monitor detects that the component has changed from broken to working status, however, the status filter transmits a "working" signal only after a recovery time interval corresponding to a computed skepticism level, and only if the component does not fail during that recovery time interval. The status filter increases the computed skepticism level, and redetermines the recovery time interval in accordance therewith, each time that the component fails after the status filter has transmitted a "working" signal. The status filter decreases the computed skepticism level, and redetermines the recovery time interval in accordance therewith, when, after the status filter has transmitted a "working" signal, the component does not fail for at least a defined interval of time.

8 Claims, 4 Drawing Sheets

INTERMITTENT COMPONENT FAILURE MANAGER AND METHOD FOR MINIMIZING DISRUPTION OF DISTRIBUTED COMPUTER SYSTEM

This application is a continuation in part of U.S. patent application Ser. No. 07/370,285, filed Jun. 22, 1989, entitled High-Speed Mesh Connected Local Area Network. U.S. patent application Ser. No. 07/370,285 is hereby incorporated by reference as background information.

The present invention relates generally to communications between components of a distributed computer system, and particularly to a method of minimizing disruption caused by intermittent component failures.

BACKGROUND OF THE INVENTION

In a mesh connected local area network, there are usually redundant interconnections between system components so that messages can be routed between any two network members in multiple ways. The network's switches monitor directly connected links and neighboring switches and set up appropriate tables so that messages are routed only through links and switches that are known to be available (i.e., which appear to be working properly). If any switch or link in the network is "not available" (e.g., not working, or disconnected), the network is configured to ignore the existence of these non-working components.

Whenever the network's switches detects a change in what is working, i.e., a component stops working or an additional component becomes available, this triggers a distributed "reconfiguration" process, by which the network redetermines the network topology and recalculates routing information. The processes for monitoring the status of links and switches, and the distributed process for reconfiguring the network are described at length in U.S. patent application Ser. No. 07/370,285, filed Jun. 22, 1989, entitled High-Speed Mesh Connected Local Area Network.

In general, each switch in the network includes hardware and software for automatically testing the status of the links connected to that switch. Like any self-diagnostic tool, it is not perfect in that it cannot detect every type of failure, especially intermittent failures. Thus, as in most systems, the ultimate test of whether a component is working is during actual use.

It is a premise of the present invention that every change in the status of a component imposes a certain amount of overhead on the system, such as requiring that the system reconfigure itself. Thus, it is often worse to repeatedly cycle back and forth between accepting a system component as working and then learning that it is broken that it would be to simply treat the component as broken. A component with a history of frequent, intermittent failure should only be reinstated when it has demonstrated that it can continuously remain in working condition for a period of time. Attempting to use a component that is broken can be harmful if it causes system users to loose information, or unnecessarily delays their work.

One prior art technique for avoiding interruptions caused by intermittently failing components is to allow only a limited number of failures during a specified amount of time. For instance, one could allow any component to fail no more than ten times per hour. That is, it will be allowed to change from "working" to "broken" status no more than ten times per hour. After ten transitions from "working" to "broken" during any one hour period, the component is simply treated as being "broken" until the end of the one hour period. Then the process starts all over again. Thus, if the component is fixed in the middle of the one hour period, its recovery will be delayed, but the system will be spared possibly hundreds or thousands of failures by the component.

Four criteria for properly limiting the failure rate of a component are as follows. (1) A component with a good history must be allowed to fail and recover several times without significant penalty. (2) In the worst case, a component's average long term failure rate must not be allowed to exceed some predetermined low rate. (3) Common behaviors shown by bad components should result in exceedingly low average long-term failure rates. (4) A component that stops being bad must eventually be forgiven its bad history.

The above described prior art "ten failures per hour" mechanism meets requirements 1, 2 and 4. Requirement 1 is met because a low number of failures (e.g., less than ten) doesn't result in the component being unused for a long period of time. Requirement 2 is met because in the worst case, the long term failure rate cannot exceed a specified number of failures per hour. Requirement 4 is met because once a broken component is fixed, and any remaining recovery time period left over from when it was broken expires, its use is no longer prevented.

Requirement 3 distinguishes the present invention from the prior art "ten failures per hour" mechanism. Regardless of the failure mechanism, this prior art technique will still allow a specified number of failures per hour.

The present invention does better than this by providing for a recovery period that increases every time that component is allowed to be used by the system and then fails. Thus, each time that a component "fools" the monitoring mechanism into allowing the component to be used only to find that the component soon thereafter fails, the recovery time period is automatically increased (up to a predetermined maximum). When a component has worked reliably for a long period of time, the recovery period is decreased for subsequent failures.

SUMMARY OF THE INVENTION

In summary, the present invention is a status filter for limiting the impact of intermittently failing components on a computer system. A fault monitor coupled to one such component detects whether that component is working. Whenever the fault monitor detects that the component has failed, i.e., changed from working to broken status, the status filter transmits without delay a "broken" signal. Whenever the fault monitor detects that the component has changed broken to working status, however, the status filter transmits a "working" signal only after a recovery time interval corresponding to a computed skepticism level, and only if the component does not fail during that recovery time interval.

The status filter increases the computed skepticism level and redetermines the recovery time interval each time that the component fails after the status filter has transmitted a "working" signal. That is, the skepticism level is increased whenever the component fails after having been declared by the status filter to be working. The status filter also decreases the computed skepticism level and redetermines the recovery time interval when, after status filter has transmitted a "working" signal, the component does not fail for at least a defined interval of time.

In the preferred embodiment, the status filter is implemented as a state machine with three states: DEAD, WAIT, and GOOD. The status filter receives "working" and "broken" signals from a fault monitor, and responds by moving to a corresponding state and selectively transmitting filtered "working" and "broken" signals to the computer system. When in the WAIT or GOOD states, it responds to receiving a "broken" signal by moving to the DEAD state and retransmitting the "broken" signal without delay.

It responds to a "working" signal when in the DEAD state by moving to the WAIT state and starting a wait timer with duration corresponding to a computed skepticism level. Upon expiration of the wait timer, it moves to the GOOD state and transmits a "working" signal. However, if a "broken" signal is received before expiration of the wait timer, the status filter stops the wait timer and returns to the DEAD state.

The computed skepticism level is increased by the status filter when, in the GOOD state, the status filter receives a "broken" signal. The computed skepticism level is decreased by the status filter when, in the GOOD state, no "broken" signals are received for at least a defined interval of time.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
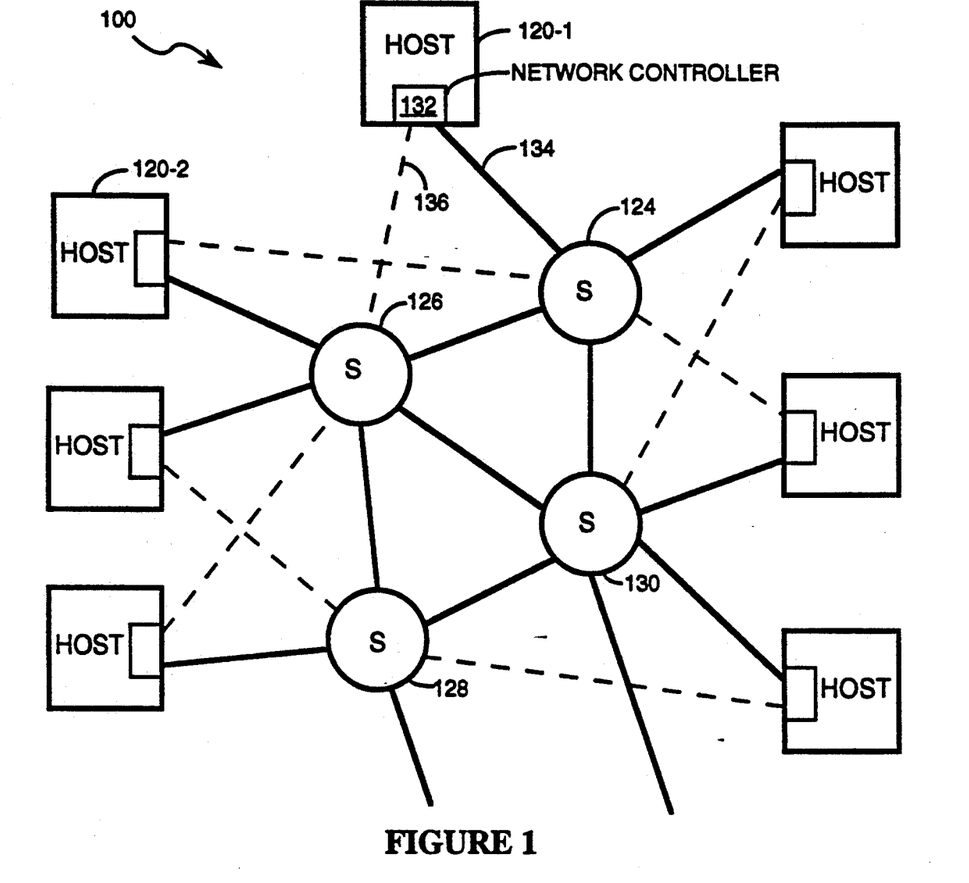
FIG. 1 is a block diagram of a mesh connected local area network.

Referring to FIG. 1, there is shown one section of a mesh connected network 100 in accordance with the present invention. The network 100 is a set of host computers 120 and switches 124-130 that are interconnected by links, which are bi-directional data channels. In the preferred embodiment, each host 120 in the network has a network controller 132 which couples the host 120 to two distinct switches (e.g., switches 124 and 126 in the case of host 120-1). The two links 134 and 136 which couple the host 120 to switches 124 and 126 are identical, except that only one of the two links is active at any one time. For this reason link 136 is shown as a dashed line to indicate that it is inactive.

Whenever the active link 134 between a host computer and a switch fails, the host's network controller 132 automatically activates the other link 136, thereby reconnecting the host to the network. It is strongly preferred that the two links 134 and 136 for each host be coupled to two different switches so that if an entire switch fails all the hosts coupled to that switch will have alternate paths to the network. Generally, the provision of two alternate paths or channels from each host to the network provides sufficient redundancy that no single hardware failure can isolate a host from the network.

Figure 2:
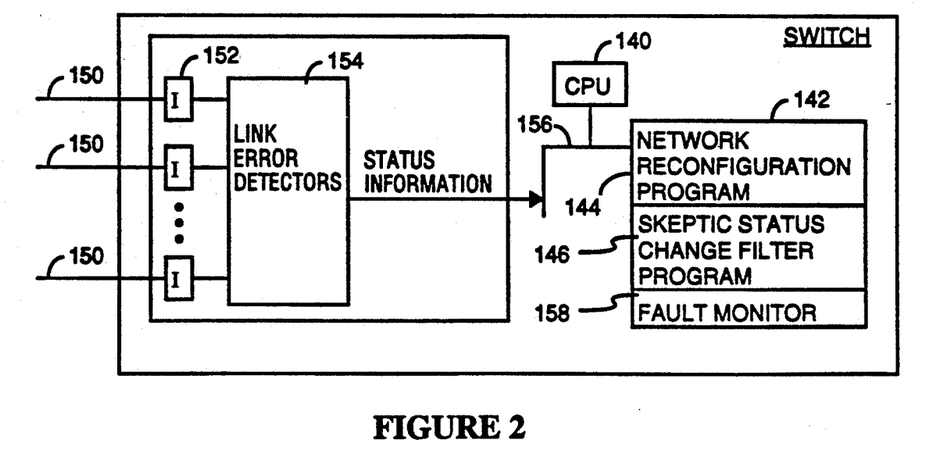
FIG. 2 is a block diagram of one node of the local area network shown in FIG. 1.

Referring to FIG. 2, each switch 124 in the local area network is coupled to its links 150 by interfaces 152. The switch has a central processing unit (CPU) 140, memory 142, and software stored in memory 142 including a network reconfiguration program 144 and a "skeptic" status change filtering program 146. Link error detectors 154 periodically send status information via the switch's internal bus 156 to a fault monitor routine 158 which determines whether each link is currently "WORKING" or "BROKEN", at least insofar as the fault monitor is able to determine. It sends corresponding "WORKING" and "BROKEN" signals to the skeptic program 146. The skeptic, in turn, sends out a filtered version of these signals to the network reconfiguration program 144.

Figure 3:
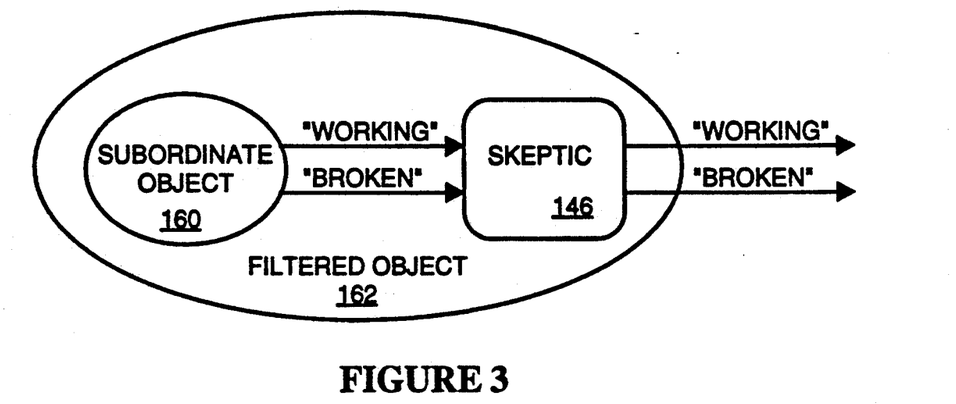
FIG. 3 is a conceptual diagram of an intermittent failure manager program in accordance with the present invention.

Referring to FIG. 3, the skeptic 146 can be viewed as a mechanism that stands between a subordinate object 160 and a higher level of the system, and which provides a "filtered object" 162 whose rate of status change is limited. As seen by the skeptic, the subordinate object 160 is an abstraction that emits a series of signals, each of which says either "working" or "broken". The skeptic 146, in turn, sends out a filtered version of these signals to the next higher level of the system. Thus, the links in the preferred embodiment could be other types of objects or system components in other embodiments of the present invention.

Figure 4:
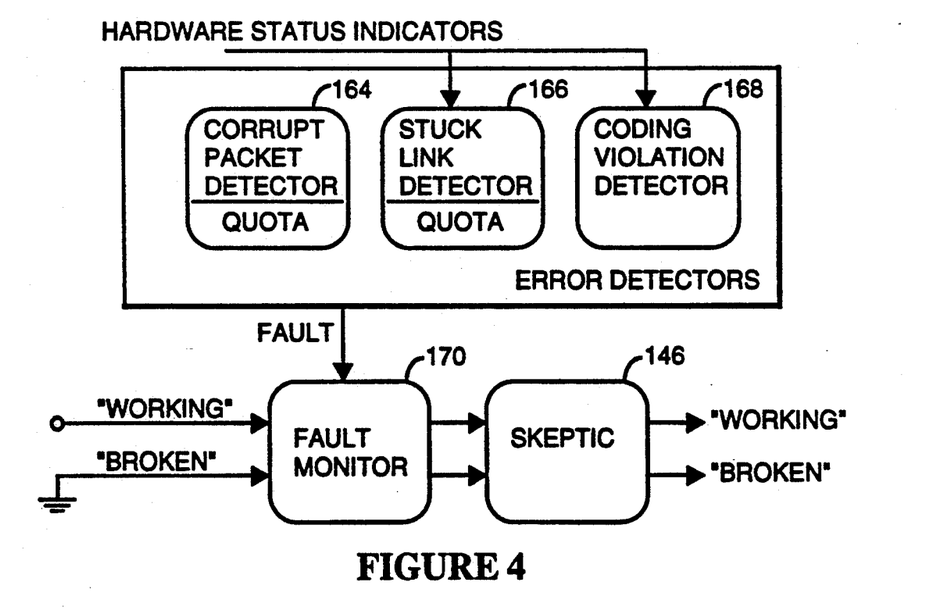
FIG. 4 is a block diagram of the fault detection mechanisms used in the preferred embodiment, and their relationship to the intermittent failure management program of the preferred embodiment.

Referring to FIG. 4, the preferred embodiment has three link error detectors 164-168. The corrupt packet detector 164 tests a CRC error correction code included with each transmitted packet. This detector uses a quota mechanism for detecting faults, based on the concept that a few corrupt packets may be the result of random glitches, but that more than a few corrupt packets are indicative of a fault. Thus, if more than five corrupted packets are received in a specified period of time (e.g., 40 minutes), this detector issues a fault, which causes the fault monitor 170 to issue a "BROKEN" signal.

The Stuck Link detector 166 detects when a link becomes stuck in a state which prevents any data transmission. When this happens, the switch automatically clears all messages in the switch and reinitializes itself. If this happens only occasionally, the condition may be due to mis-transmission of a single flow-control command or packet framing command code (i.e., due to errors in critical data bits that control usage of the link). This error detector also imposes a quota on how many such errors it will forgive in any period of time before declaring a fault.

The coding violation detector 168 detects static on the communication link. For example, coding violations can result from connecting or disconnecting the link cable, from a cable that is too long for good transmission, or from a nearby electric motor. As with other types of errors, isolated violations should be ignored but a burst of violations is a significant error. The violation detector checks the number of violations during successive test periods, each about 170 milliseconds long, checks the number of violations during each test period, and declares a fault only if a threshold violation rate is exceeded. The permitted number of violations depends on whether the skeptic says the link is working or broken. If the link is working (according to the skeptic 146), three errors are permitted per test period, but if the link is broken no errors are permitted. The more strict rule for broken links insures that no link will recover unless it can pass the entire skeptic recovery time without a single coding violation, while occasional violations on working links are ignored.

Figure 5:
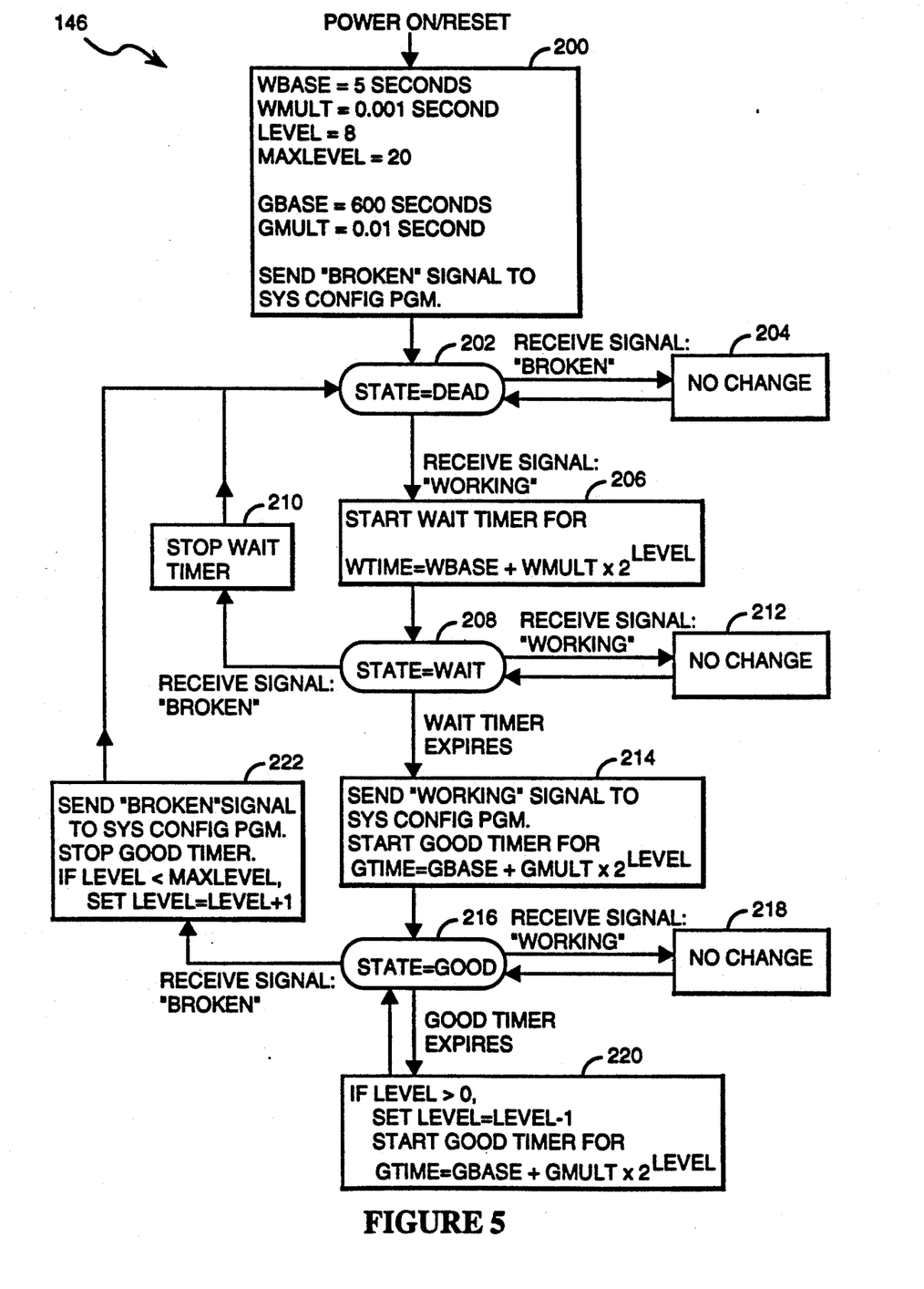
FIG. 5 is a flow chart of the intermittent failure management program of the preferred embodiment.

Referring to FIG. 5, the skeptic program 146 is a state machine with auxiliary variables (e.g., level, wtime, gtime), timers, and policy parameters. The three states for the skeptic are State=DEAD, which means that the link is broken, State=WAIT, which means that the link is working but the skeptic is delaying for a while before passing on that information, and State=GOOD, which means that the link is working and the skeptic has concurred. Thus, transitions from GOOD to DEAD, due to detection of a broken link, are transmitted by the skeptic immediately. But transitions from DEAD to GOOD are delayed for a variable period of time, to help ensure that the link is working consistently before passing that information on to the system.

When the system is first powered on, the skeptic defines a set of policy parameters and sends a "BROKEN" signal to the system reconfiguration program (step 200). Then it moves to the DEAD state (step 202). When in the DEAD state, "BROKEN" signals received by the skeptic are ignored (step 204), since they provide no new information. A "WORKING" signal, causes the skeptic to start a wait timer (step 206), and to move into the WAIT state (step 208). The duration of the wait timer is calculated by a formula described below. If the skeptic receives a "BROKEN" signal and returns to the DEAD state before the wait timer expires, the timer is stopped (step 210).

While in the WAIT state, "WORKING" signals received by the skeptic are ignored (step 212), since they provide no new information.

The skeptic responds to intermittent failures by maintaining a level of skepticism about the subordinate object. The skepticism level is kept in an auxiliary variable called LEVEL. The skepticism level is used to compute WTIME, the duration set on the wait timer, according to the formula:

$$WTIME = WBASE + WMULT \times 2^{LEVEL}$$

where WBASE and WMULT are policy parameters. A policy parameter MAXLEVEL establishes an upper limit on skepticism.

When the wait timer expires, the skeptic sends a "WORKING" signal to the system reconfiguration program, starts a good timer and moves to the GOOD state (steps 214 and 216). This is the only way the skeptic can get to the GOOD state.

While in the GOOD state, "WORKING" signals received by the skeptic are ignored (step 218), since they provide no new information.

The skeptic forgives old failures by decrementing the skepticism level occasionally. Whenever the good time expires, the skeptic decrements the skepticism level and then sets and restarts the good timer (step 220), unless the skepticism level has already been reduced to a level of zero. The formula used to compute the duration of the good timer, GTIME, is the same as the formula used for the wait timer, except that it uses different policy parameters GBASE and GMULT:

$$GTIME = GBASE + GMULT \times 2^{LEVEL}.$$

In the preferred embodiment, GBASE, the minimum amount of time required to forgive one level of skepticism is ten minutes. This limits the worst case long-term average failure rate to about six times per hour.

While in the GOOD state, receiving a "BROKEN" signal causes the skeptic to immediately send a "BROKEN" signal, and stop the good timer. It also increments the skepticism level by one (step 222), and moves the skeptic into the DEAD state (step 202).

Figure 6:
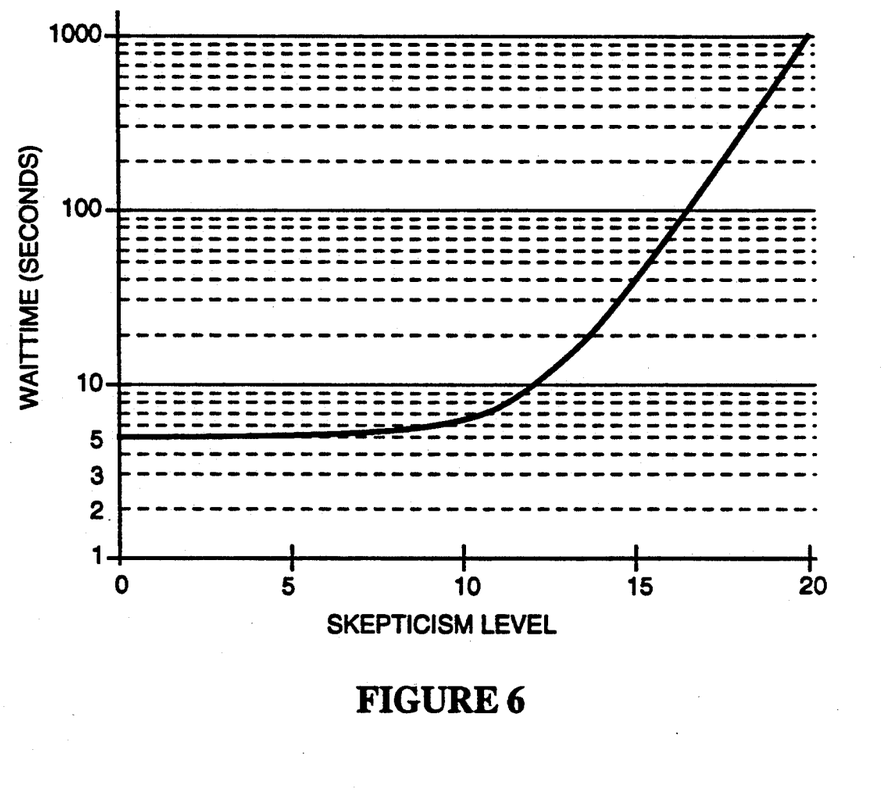
FIG. 6 is a diagram showing the relationship between a "skepticism level" and the wait time before a transition from "broken" to "working" of a system component is accepted.

Referring to FIG. 6, there is shown a diagram showing the relationship between the "skepticism level" and the wait time WTIME, using parameter values WBASE=5 seconds, WMULT=0.001 second. Using these parameters, the WTIME formula remains fairly flat at about 5 seconds up to about LEVEL=10, and above LEVEL=12 the wait time WTIME rises exponentially, approximately doubling with each increase in the skepticism level. Using a maximum level of twenty, the maximum wait time will be about seventeen minutes. By resetting the values of WBASE and WMULT, one can reset the crossover point between low and high levels of skepticism.

The initial skepticism LEVEL is set equal to 8 because we don't know at power up time we don't know the link's history, and therefore we don't know whether the link should have a high or low skepticism level.

A few examples of how the skeptic responds to common problems will illustrate its utility. One common link failure mode, especially in newly installed hardware, is that the link transceiver hardware continuously detects coding violations. In this case, the coding violation detector will declare a fault about once every 170 milliseconds. Because this is much less than the five second minimum wait time, the skeptic never lets the link recover, and the skepticism LEVEL remains unchanged. To the rest of the system, the link appears permanently broken.

Another common link failure mode occurs when a technician connects a link cable. As the metal components scrape past each other, the link transceiver hardware detects bursts of coding violations that are evaluated as faults. Each additional wiggle of the cable tends to generate more faults. The five second minimum wait time in the skeptic causes all of these faults to be reflected as only one failure.

A third common failure mode occurs on marginal links. The error rate on a marginal link is usually very data dependent: it is much higher when the link is carrying packets than when it is idle. This results in such a link failing soon after it recovers, but then having no further faults until it recovers again. The skepticism level increases over time until it reaches its maximum value, MAXLEVEL, which is set to twenty in the preferred embodiment, at which point the wait time is about seventeen minutes. Depending on what the desired long term failure rate is for such links, the MAXLEVEL and WMULT parameters can be set accordingly. For instance, a MAXLEVEL of twenty-five will result in a maximum wait time of about 9.3 hours.

Consider how the skeptic fulfills the design requirements. (1) A good history is represented by a low skepticism level. In this case, the skeptic delays a minimum time in WAIT sate, and consequently the filtered object recovers soon after the subordinate object recovers. (2) The worst case long-term average failure rate of the filtered object results when the skeptic spends the minimum time in the GOOD state required to forgive the lowest level of skepticism. The bound can be proved using a counting argument on the number of failures and observing that at sufficiently high skepticism levels the wait time exceeds the lowest level time to forgive. (3) A subordinate object that tends to fail again soon after the filtered object recovers will tend to increase the skepticism level. (4) If the subordinate object remains working, eventually all skepticism will be forgiven.

Another feature of the skeptic in the preferred embodiment is that the duration set on the wait timer actually varies as a random fraction between one and two time the value calculated for WTIME. This random variation causes different skeptics in the computer system to disperse their wait timer expirations. If the network is running with several intermittent links, this randomness reduces the possibility of getting caught in a systematic pattern.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the recovery time intervals associated with various skepticism levels could be determined simply by precomputing or predetermining the recovery time interval for all the possible skepticism levels, and then looking up the appropriate recovery time interval whenever the wait timer is to be started. The table lookup mechanism is flexible it that it allows "manual" fine tuning of the system, for instance by allowing the first few skepticism levels to be programmed with a constant recovery time interval, or with a slowly, linearly increasing amount, or whatever the system programmer chooses.

What is claimed is:

1. In a distributed computer system having components which may fail intermittently, an intermittent failure filter comprising:

status detection means, coupled to one of said components which may fail intermittently, which detects whether said component is working and transmits "working" and "broken" signals in accordance with said component's status; and a status filter, coupled to said status detection means, which receives said "working" and "broken" signals from said status detection means, retransmits without delay "broken" signals received after receiving a "working" signal, and retransmits received "working" signals only after a recovery time interval corresponding with a computed skepticism level during which no "broken" signals are received; wherein said status filter increases said computed skepticism level each time that a "broken" signal is received after said status filter has retransmitted a "working" signal.

2. The intermittent failure filter of claim 1, wherein said status filter decreases said computed skepticism level and redetermines said recovery time interval when, after said status filter has retransmitted a "working" signal, said status filter does not receive a "broken" signal for a second defined interval of time.

3. In a distributed computer system having components which may fail intermittently, an intermittent failure filter comprising:

status detection means, coupled to one of said components which may fail intermittently, which detects whether said components is working and transmits "working" and "broken" signals in accordance with said component's status; and a status filter, coupled to said status detection means, having first, second and thirds states, which receives said "working" and "broken" signals and responds by moving to a corresponding state and selectively transmitting filtered "working" and "broken" signals to said computer system; wherein said status filter responds to receiving a "broken" signal, when in said second and third states, by moving to said first state and retransmitting said "broken" signal; said status filter responding to receiving a "working" signal when in said first state by moving to said second state and starting a wait timer with duration corresponding with a computed skepticism level; said status filter responding to expiration of said wait timer by moving to said third state and retransmitting said "working" signal; said status filter responding to "broken" signals received which in said second state by stopping said wait timer and returning to said first state; said status filter responding to receiving a "broken" signal, when in said third state, by retransmitting said "broken" signal, increasing said computed skepticism level, and moving to said first state.

4. The intermittent failure filter of claim 3, wherein said status filter decreases said computed skepticism level, when in said third state after said status filter has retransmitted a "working" signal and said status filter does not receive a "broken" signal for a defined interval of time.

5. A mesh connected local area network for interconnecting a multiplicity of hosts, said network comprising:

a multiplicity of switch means for simultaneously routing a multiplicity of data packets between hosts in the network; said hosts and switch means together comprising network members;

a multiplicity of point to point link means for interconnecting said switch means and the hosts in said network, each point to point link means providing a communication channel between two of said network members; said multiplicity of link means including spanning tree links and a multiplicity of additional links;

said multiplicity of switch means and said spanning tree links together comprising a spanning tree in which one of said switch means is designated the root of said spanning tree;

each switch means including reconfiguration means for determining the position of said switch means in said spanning tree, said reconfiguration means including:

configuration change detection means for detecting a change in the configuration of said network, including means for detecting the existence of a new connection between said switch means and another one of said network members and for detecting the breaking of a connection between said switch means and another one of said network members;

a status filter, coupled to said configuration change detection means, which transmits a configuration change signal without delay whenever said configuration change detection means detects the breaking of a connection between said switch means and another one of said network members; said status filter responding to said configuration change detection means detecting the existence of a new connection between said switch means and another one of said network members by transmitting a configuration change signal only after a recovery time interval corresponding with a computed skepticism level during which said new connection does not fail; wherein said status filter increases said computed skepticism level each time that a new connection fails after said status filter has retransmitted a configuration change signal in response to said new connection being detected; and reconfiguration initiation means, coupled to said status filter, for responding to configuration change signals by initiating reconfiguration of said network;

whereby disruption of said network by an intermittently operative connection is limited.

6. The mesh connected local area network of claim 5, wherein said status filter decreases said computed skepticism level and redetermines said recovery time interval when, after said status filter has transmitted a configuration change signal, said new connection does not fail for at least a defined interval of time.

7. In a distributed computer system having components which may fail intermittently, a method of limiting interruption by intermittent component failures comprising:

determining whether a component is working and transmitting "working" and "broken" signals in accordance with said component's status;

retransmitting received "working" signals only after a recovery time interval corresponding with a computed skepticism level during which no "broken" signals are received;

retransmitting without delay "broken" signals received after retransmitting a "working" signal; and increasing said computed skepticism level, and redetermining said recovery time interval in accordance therewith, each time that a "broken" signal is received after a "working" signal has been retransmitted.

8. The intermittent failure filter of claim 1, decreasing said computed skepticism level and redetermining said recovery time interval in accordance therewith when, after a "working" signal has been retransmitted, a "broken" signal is not received for at least a second defined interval of time.

* * * * *

UNITED STATES PATENT AND TRADEMARK OFFICE
CERTIFICATE OF CORRECTION

PATENT NO. : 5,260,945
DATED : November 9, 1993
INVENTOR(S) : Thomas L. Rodeheffer It is certified that error appears in the above-identified patent and that said Letters Patent is hereby corrected as shown below:

Column 8,
Line 8, delete "components" and insert therefor -- component --

Signed and Sealed this

Fourteenth Day of June, 2005

JON W. DUDAS
*Director of the United States Patent and Trademark Office*